Figure 1:
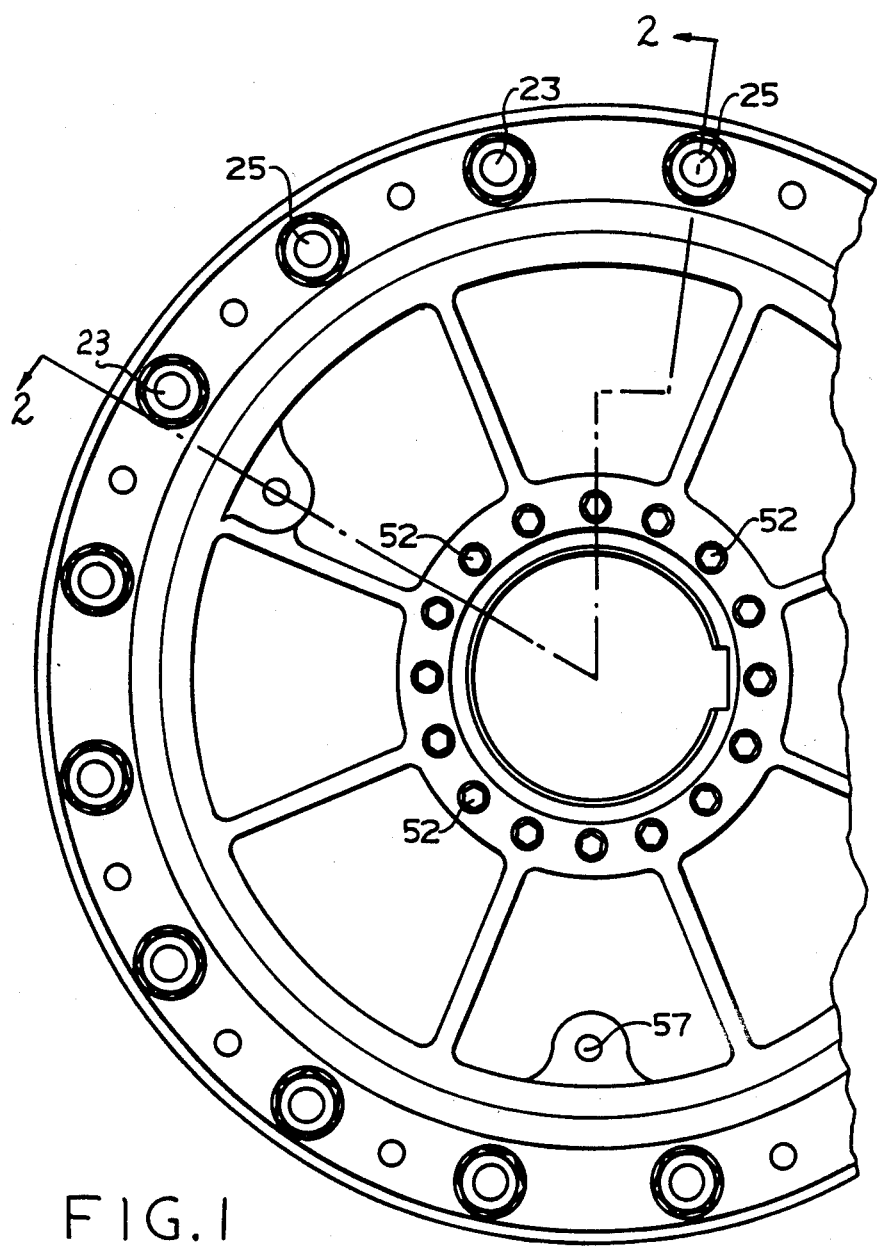

United States Patent [19]

Collins et al.

[11] Patent Number: 4,609,076

[45] Date of Patent: Sep. 2, 1986

[54] SPRING ENGAGED FLUID RELEASED MULTI-DISC BRAKE ASSEMBLY

[75] Inventors: Marcus H. Collins, Akron; Robert P. Petkash, Fairview Park, both of Ohio

[73] Assignee: Eaton Corporation, Cleveland, Ohio

[21] Appl. No.: 764,974

[22] Filed: Aug. 12, 1985

Related U.S. Application Data

[63] Continuation of Ser. No. 528,485, Sep. 1, 1983, abandoned.

[51] Int. Cl.$^4$ .................. F16D 55/38; F16D 55/40
[52] U.S. Cl. .................. 188/71.5; 188/73.2; 188/170; 188/250 R; 192/83; 192/91 A
[58] Field of Search .................. 188/71.5, 72.4, 72.5, 188/73.2, 105, 106 R, 106 P, 170, 250 R, 250 B, 346, 367, 368, 369; 192/83, 91 R, 91 A, 107 M

[56] References Cited

U.S. PATENT DOCUMENTS

| | | | |
|---|---|---|---|
| 1,883,981 | 10/1932 | Lane | 188/250 R |
| 2,238,943 | 4/1941 | McCune et al. | 188/71.5 |
| 3,335,834 | 8/1967 | Wach | 192/91 A |
| 3,862,678 | 1/1975 | Collins | 188/264 D X |
| 3,951,240 | 4/1976 | Dowell et al. | 188/71.5 |
| 4,172,511 | 10/1979 | Khuntia et al. | 188/170 |

FOREIGN PATENT DOCUMENTS

| | | | |
|---|---|---|---|
| 2343930 | 10/1977 | France | 188/71.5 |
| 2422865 | 11/1979 | France | 188/72.4 |

Primary Examiner—Bruce H. Stoner, Jr.
Assistant Examiner—Richard R. Diefendorf
Attorney, Agent, or Firm—C. H. Grace; C. J. Toddy

[57] ABSTRACT

A disc brake unit comprises a disc assembly of interleaved rotor discs and stator discs that are normally spring in one direction biased to a brake engaged condition. A hydraulically operated first piston engages a stator disc at one end of the unit to move it axially in opposition to the spring bias to release the pressure between the discs and thus release the brake. A non-rotatable stop adapted to contact only one intermediate stator disc is provided to prevent movement of the intermediate disc in a direction opposite to the one direction. A second piston engages a stator disc at the opposite end of the unit for moving the rotor and stator discs on one side of a stop into engagement with each other and applies a modulated force to said rotor and stator discs while the first power piston is in position to oppose the spring bias, to thereby apply slip braking torque to the output shaft.

7 Claims, 2 Drawing Figures

SPRING ENGAGED FLUID RELEASED MULTI-DISC BRAKE ASSEMBLY

This application is a continuation, of application Ser. No. 06/528,485, filed 9/1/83, abandoned.

This invention relates generally to multiple disc torque transmitting devices and more particularly to a multiple disc brake assembly in which some of the discs are used for slipping or modulating the braking torque and some or all of the discs are used for applying a high static holding torque.

In certain types of slip/hold applications for brakes, such as an anchor hoist for off-shore drilling platforms, winches, and the like, it is necessary to control slipping torque during pay-out of the anchor chain or cable but apply a very high static holding torque on the anchor chain or cable after the platform has been properly positioned. The required holding torque on the chain or cable is approximately five times greater than the slipping torque.

In conventional spring set brakes such as that shown in this Pat. No., 3862678, the slipping torque is varied by accurately modulating the release pressure and partially biasing the spring force. As the brake lining wears, this pressure range will change because of changes in the spring rate of the springs. Another problem with conventional spring set brakes is that a low coefficient lining is used to assure smooth torque during the slip cycle. To accomplish a large holding torque, many springs are needed and therefore a high release pressure is required. Normally this higher air pressure is not available on off-shore drilling rigs. Higher coefficient linings can not be used because of their tendency to gall the wear plates and produce erratic torque.

It is an object of this invention to provide an improved, fluid cooled, torque transmitting device particularly adapted for winches and anchor hoists and the like which provides a very high holding torque as well as a very smooth uniform slipping torque during the slip cycle as needed, for example, in lowering an anchor into position on the ocean floor.

Another object of the invention is to provide in a unitary structure two sets of friction discs, one set used for slipping and the other set of discs used for high static holding torque. The set of friction disks used for slipping may have a lower coefficient of friction than the set used for holding.

Figure 2:
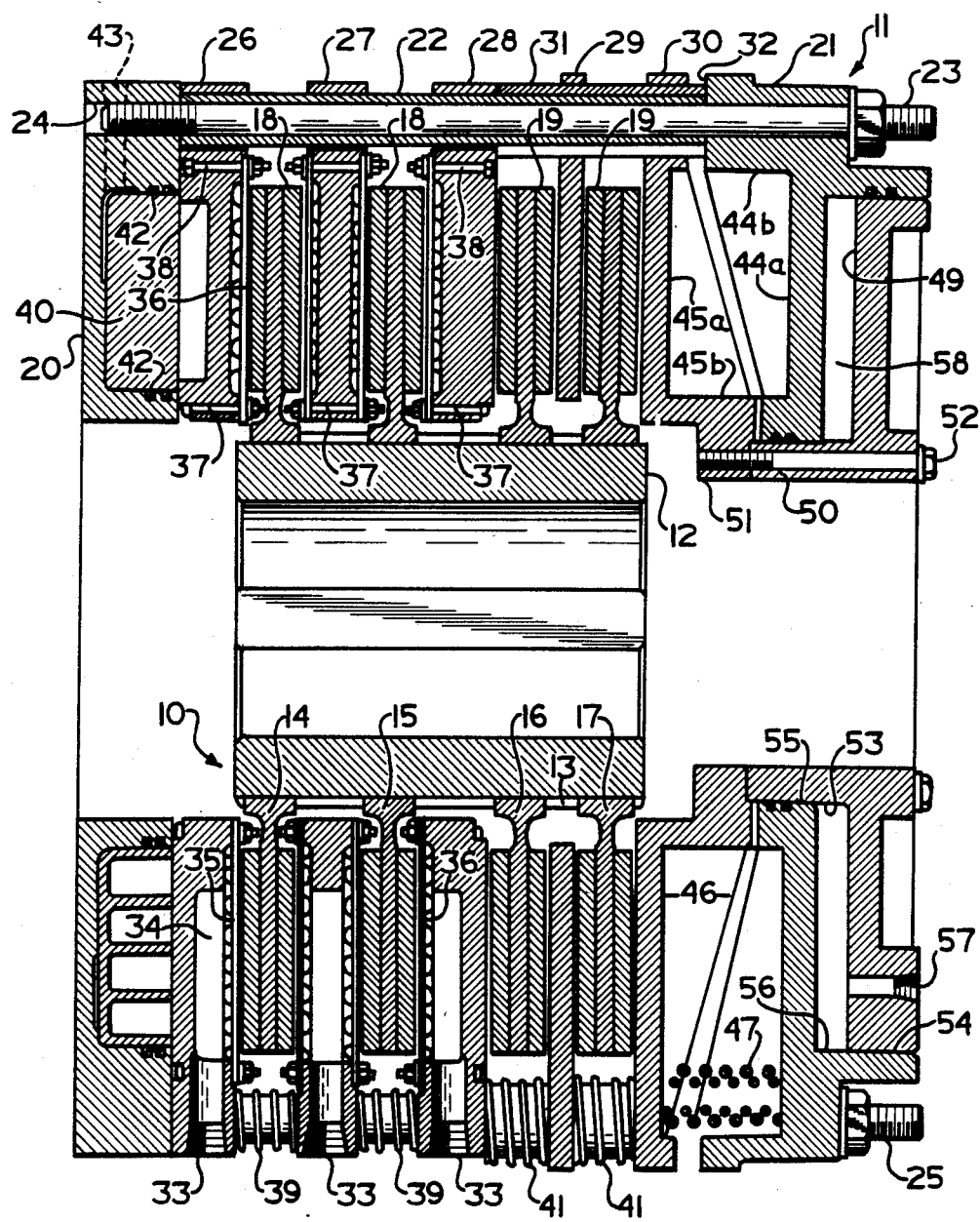

The invention may take several physical forms, but a preferred embodiment of the invention will be described in detail and illustrated in the accompanying drawings which form a part hereof and wherein;

FIG. 1 is an end view of the torque transmitting device of the subject invention; and FIG. 2 is a side elevational view and sectional view taken along the lines 2—2 of FIG. 1.

Referring to the drawings there is shown a water cooled brake of the multiple disc type. The term brake is used in the description in its broadest sense rather than a limiting sense and is intended to include those devices commonly known as clutches as well as brakes wherein the output member is free to rotate. The brake includes a relatively rotatable first assembly 10 and the relatively fixed assembly 11 which are adapted to be coupled to one another when the brake is actuated.

The first assembly 10 includes a rotatable input shaft (not shown) keyed or geared to an annular input member 12. The annular input member 12 is splined at its external surface, as at 13 and receives in splined engagement a plurality of rotor discs 14, 15, 16 and 17 which are thus free to move axially with respect to the input member 12 but which rotate with the member 12. Secured to each side of each rotor disc 14 and 15 is an annular layer of friction material forming annular friction discs 18. The friction discs 18 are preferably formed from friction material having a low coefficient of friction. Secured to each side of each disc 16 and 17 is an annular layer of friction material forming annular friction discs 19. The friction discs 19 are preferably formed from a material having a higher coefficient of friction than the friction discs 18. The friction discs 18 and 19 are bonded to the respective rotor discs although the friction discs may be secured by fasteners to permit easy replacement of the friction discs when worn.

The second fixed assembly 11 includes annular fixed end castings 20 and 21 spaced axially apart by spacer tubes 22. Studs 23 pass through each of the spacer tubes 22 and are threadedly engaged in a plurality of tapped holes 24 in the end casting 20. The studs 23 extend through bores in the end casting 21 and rigidly hold each of the end castings 21 and 20 against the ends of the spacer tubes 22 to rigidly hold the end castings in axially spaced relationship. As shown in FIG. 2 of the drawings the studs 23 are symmetrically positioned circumferentially about the pheriphery of the castings 20 and 21. Interposed intermediately of the studs 23 are similar studs 25 extending through appropriately aligned holes in the casting 21 and threadedly secured at the opposite end into aligned holes (not shown) in the casting 20.

A plurality of stator brake discs 26, 27, 28, 29 and 30 are mounted non-rotatably on the spacer tubes 22 for axial movement relative to the end castings. Each of the stator discs 26 through 30 include a plurality of circumferentially spaced bores through which the studs 23 and the spacer tubes 22 project so that the stator discs 26, 27, and 28 are slidably mounted thereon and free to move axially of the spacer tubes 22 a limited distance. A plurality of spacer tubes 31 of larger diameter than the spacer tubes 22 are positioned between the intermediate stator disc 28 and the radially extending surface 32 of the casting 21 so that axial movement of the stator disc 28 is prevented beyond the spacer tube 31, in a direction to the right of the drawing. The stator discs 29 and 30 are provided with holes aligned circumferentially thereof at the outer pheriphery of each of the stator discs and through which the spacer tubes 31, spacer tubes 22 and studs 23 project so that each of the stator discs 29 and 30 may move axially relative to the end plates 20 and 21.

Each stator disc 26, 27 and 28 is water cooled and includes an inlet opening 33 leading to a slot-like inlet cavity 34 which in turn communicates with an annular or a ring shaped array of flow cavities 35. The flow cavities 35 are in effect spaces between small projections which are cast onto the surface of each stator disc in an annular array shown extending radially a distance equal to the radial distance of the annular friction discs 18. Two such arrays are shown formed in the stator disc 27. A slot-like outlet cavity and return fitting (not shown) are located diametrically opposite the inlet opening 33 and cavities 35 to provide a fluid circuit for the coolant.

Each annular array of flow cavities 34 is closed by an annular relatively thin heat conductive copper wear plate 36 secured to the respective stator disc by a plurality of fasteners 37 extending through holes in each stator disc. Similarly, a plurality of fasteners 38 secure the radially outward edges of the wear plates to the respective stator disc. An annular inner and outer gasket is provided to seal the wear plates.

Each spacer tube 22 mounted on the studs 25 carries springs 39 bearing against the stator disc 27 and one of the adjacent stator discs 28 or 30 to thereby center the stator disc 27 and retract the piston 40 when the brake is unactuated. Similarly, each of the spacer tubes 31 surrounding the studs 25 carries springs 41 bearing against the stator disc 29 as well as one of the stator discs 28 and 30 so as to center the stator disc 29 and retract the piston 40 when the disc is unactuated.

The end casting 20 is provided with an annular cavity in which is mounted an annular piston 40 having suitable seals 42 for sealing the cylindrical walls of the piston with the walls of the annular cavity. Fluid may be injected through inlet 43 into the cavity to move the piston 41 axially into engagement with the stator disc 26 to move the stator disc 26, the rotor disc 14, the stator disc 27 and, the rotor disc 15 and the stator disc 28 into engagement with each other. The stator disc 28 moves into abuttment with the ends 32 of the tubes 31 and is prevented from further axial movement.

End casting 21 is provided with annular walls 44a and 44b and corresponding walls 45a and 45b formed in the stator disc 30 forming a chamber 46 in which are mounted helical springs 47 interposed between the wall 45a of the stator disc 30 and the wall 44a of the end casting 21. Thus, the springs 47 bias the stator disc 30 to the left to urge all of the rotor discs and all of the stator discs into engagement with each other to prevent relative rotation between the input member 12 and the fixed assembly 11.

To effect release of the brake, an annular piston 49 is rigidly connected by a cylindrical extension 50 to the flange 51 of the stator disc 30 by means of a plurality of fasteners 52. The cylindrical surfaces 53 and 54 of the piston 49 are suitably sealed and move axially on the cylindrical surfaces 55 and 56 formed in the end casting 21. Fluid may be injected through inlet 57 into the cavity 58 to move the piston axially to the right which causes the stator disc 30 to also move to the right. The stator disc 30, thus, compresses the springs 46, thereby, removing the bias from and the disengagement of all of the rotor discs and stator discs from each other and the brake is released.

The brake of this invention operates as follows. Assuming that the input member 12 is coupled to a winch or hoist for paying out a cable or chain to lower a load or anchor, fluid pressure would be released from the pistons 41 and 49 so that the springs 47 apply full holding torque to all of the rotored discs and thus hold the anchor in its upper most position. To pay out the anchor, fluid pressure is applied to the piston 49 which moves the stator disc 30 to the right compressing the springs 47 and thus releases all of the rotor discs. Fluid, under a modulating pressure, is supplied to the pistons 41 thereby moving the rotor discs 26, 27, and 28 to the right against the stop 32 to thereby apply a very smooth uniform slipping torque as the load is lowered. When the anchor reaches the ocean floor, pressure is released from the pistons 41 and 49 so that the springs 47 are released and full spring holding torque is applied to the rotor discs.

From the foregoing, it will be appreciated that a spring engaged fluid released multi disc brake assembly is provided in a unitary structure with a set of low coefficient of friction discs to provide a smooth uniform slipping torque during the slip cycle and a set of high coefficient of friction discs to provide a very high static holding torque.

We claim:

1. A spring-engaged, pressure-fluid disengaged disc brake assembly comprising a shaft adapted to be fixed to a rotating component of a mechanism, a plurality of rotor discs axially movably mounted on said shaft and rotatable with said shaft, a plurality of stator discs interleaved with said rotor discs, friction discs interposed between said rotor and stator discs, means supporting said stator discs for limited movement axially of said shaft, spring means for biasing all of said stator and rotor discs axially into engagement with each other in a direction away from one end of said assembly, non-rotatable stop means other than said stator and rotor discs, adapted to contact only one intermediate stator disc radially outwardly of said friction discs to prevent movement of said one intermediate disc axially toward said one end of said assembly, first power means for compressing said spring means to release all of said rotor and stator discs from engagement with each other, second power means for moving the rotor and stator discs on one side of said stop means into engagement with each other and said one intermediate disc while said first power means compresses said spring means, and means for controlling said second power means to apply a modulated force to said rotor and stator discs while said first power means compresses said spring means, to thereby apply slip-braking torque to said shaft.

2. A brake assembly as claimed in claim 1 in which said friction discs interposed between said stator and rotor discs on one side of said stop means have a lower coefficient of friction than the fricition discs interposed between said stator and rotor discs on the other side of said stop means.

3. A brake disc assembly as claimed in claim 1 in which said brake assembly includes first and second end plates, a plurality of spacer means positioning the end plates in axially fixed position, fastening means for securing the end plates in abutting relationship to said spacer means, said supporting means including means on the outer periphery of said stator discs co-acting with said spacer means to prevent said stator discs from rotating.

4. A disc brake assembly as claimed in claim 3 in which said stop means comprises a tube mounted on each of said spacer means and abutting against said intermediate stator disc, the stator discs positioned between said intermediate stator disc and said one end of said assembly having means at the periphery thereof slidably mounted on said stop means.

5. A disc brake assembly as claimed in claim 1 in which said brake assembly includes first and second end plates, and said spring means are positioned in a chamber formed in part by surfaces of an end stator and the adjacent end plate, said spring means reacting between said end plate and said end stator to force all of the discs into engagement with each other.

6. A disc brake assembly as claimed in claim 5 in which said first power means includes a piston secured to said end stator radially inwardly of said end plate.

7. A disc brake assembly as claimed in claim 6 in which said end plate includes an axially extending cylindrical surface co-acting with said piston.

* * * * *